Patented Mar. 26, 1940

2,194,906

UNITED STATES PATENT OFFICE 2,194,906

NITROGENOUS CONDENSATION PRODUCT AND PROCESS OF PRODUCING SAME

Hans Krzikalla, Conrad Schoeller, Wilhelm Pannwitz, and Heinrich Denner, Ludwigshafen-on-the-Rhine, Germany, assignors to I. G. Farbenindustrie Aktiengesellschaft, Frankfort-on-the-Main, Germany No Drawing. Application April 8, 1937, Serial No. 135,726. In Germany April 11, 1936

10 Claims. (Cl. 260—584)

The present invention relates to new valuable nitrogenous condensation products and a process of producing same.

We have found that valuable nitrogenous condensation products are obtained by causing compounds of the general formula:

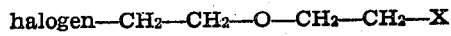

(in which X is halogen or —O.COR or —OR, R being hydrogen, alkyl, cycloalkyl, aralkyl, aryl or the corresponding substituted radicals) to react with organic bases containing nitrogen, and if desired converting the resulting compounds into quaternary ammonium compounds, the reaction components being so selected that the final product contains at least one radical with at least 6 carbon atoms directly attached to one another or a polyalkylene polyamine chain containing at least 6 carbon atoms. Preferably per each halogen atom of the compound shown by the above formula at least about 1 molecular proportion of an organic base is employed and preferably per each molecular proportion of the halogen compound at least one molecular proportion of such an organic base is used as is free from aromatic radicals. The process may also be carried out in the presence of inert solvents.

For example 1 molecular proportion of beta, beta'-dichlordiethyl ether may be brought into reaction with 2 molecular proportions of tertiary amines, as for example dimethyldodecylamine, dimethyloctodecylamine or amine mixtures containing the radicals of the alcohols corresponding to the palm kernel fatty acids. In this way diquaternary ammonium compounds which are readily soluble in water are obtained. Alternatively, 1 molecular proportion of the said or other tertiary amines, as for example 1 molecular proportion of trimethylamine, triethylamine, triethanolamine, diethylethanolamine, pyridine or methylpiperidine may first be reacted with dichlordiethyl ether and the resulting product reacted with 1 molecular proportion of a primary or secondary amine, such as octodecylamine, octodecenylamine, dimethylamine, aniline, ethylaniline or naphthylamine, the secondary or tertiary amino group thus formed being also subsequently converted into a quaternary ammonium group, if desired, and care being taken that at least one of the amines used or the substances used for the subsequent conversion of the amino groups into quaternary groups contains at least one radicle having 6 or more carbon atoms. In the resulting products, the amino groups may if desired be converted into quaternary ammonium groups, for example by the action of dimethyl sulphate, methyl bromide, methyl iodide, benzyl chloride, benzyl bromide or cetyl iodide. They may also be converted into products which are soluble in water or alkalies by treatment with ethylene oxide.

Dichlordiethyl ether may also be brought simultaneously into reaction with a tertiary amine and a primary or secondary amine, the amino groups formed then being converted into quaternary ammonium groups if desired. Furthermore 1 molecular proportion of dichlordiethyl ether may be reacted with 2 molecular proportions of primary or secondary amines and then converted if desired into quaternary compounds.

For reaction with amines there may also be used compounds of the type:

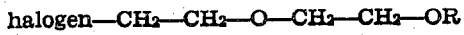

which are obtainable by the reaction of beta, beta'-diclordiethyl ether with equimolecular proportions of alkali compounds of phenols, as for example sodium phenolate, or alcoholates of aliphatic, cycloaliphatic or aliphatic-aromatic alcohols, as for example alcoholates of methyl, ethyl, butyl, amyl, cethyl, benzyl or phenylethyl alcohols, cyclohexanol, abietinol or its hydrogenation products containing hydroxyl. These compounds may be immediately converted into quaternary ammonium compounds by condensation with tertiary amines or first condensed with primary or secondary amines and then converted into quaternary ammonium compounds.

The procedure is similar when using as initial materials for the reaction with amines compounds of the type:

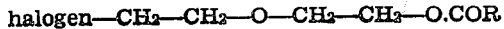

for example the esterification products of beta-chlor-beta'-hydroxydiethyl ether with saturated or unsaturated aliphatic, cycloaliphatic, aliphatic-aromatic or aromatic carboxylic acids such as oleic acid, fatty acids derived from the oxidation of paraffin wax, stearic acid, phenylacetic acid, benzoic acid, phthalic acid, montanic acid, resin acids, such as abietic acid, and their hydrogenation products or colophony and naphthenic acids. Esterification products of beta-chlor-beta'-hydroxydiethyl ether with carboxylic acids containing halogen, such as chloracetic acid, alpha-chlorbutyric acid, alpha-bromolauric acid or delta-bromopropylmalonic acid. In this case the halogen contained in the acid radicle may also be reacted with primary, secondary or tertiary amines. In this case also the simultaneous reaction of a tertiary amine and a primary or secondary amine leads to the formation of valuable products. If desired beta-chlor-beta'-hydroxydiethyl ether may be first reacted with the equivalent amount of an amine, the etherification or esterification of the hydroxyl group then being effected. Also in all cases in which esterification products of the said kind are used or prepared, amino groups present may be converted into quaternary ammonium groups.

The products of the process according to this invention are solid to salve-like masses of which many only crystallize after standing for a long period. The quaternary compounds dissolve readily in water with the formation of stable solutions. The products are distinguished by good wetting, foaming and softening power; some are also distinguished by excellent washing and dispersing power, for example for mineral oils and many also have antiseptic action. Some of the products are suitable as dressing agents for artificial silk. The water-insoluble products containing no quaternary groups may be used for example in the form of soluble salts, for example with acetic acid, lactic acid or hydrochloric acid.

The following examples will further illustrate the nature of this invention but the invention is not restricted to these examples. The parts are by weight.

Example 1

282 parts of oleic acid are heated at from 170° to 175° C. with 125 parts of beta-chlor-beta'-hydroxydiethyl ether while distilling off the water formed. The reaction product is heated with 79 parts of pyridine for some hours at 160° C. The resulting brownish solid mass dissolves in water giving a clear solution. The solution, which is stable in hard water and also in weak acid and alkaline media, has good wetting and washing action and improves the fastness to water of substantive dyeings.

Example 2

253 parts of octodecylamine and 125 parts of beta-chlor-beta'-hydroxydiethyl ether are heated at about 160° C. for 3 hours. After adding 95 parts of chloracetic acid the whole is further heated, the water formed being distilled off. The resulting solid brownish product is heated on the waterbath with 79 parts of pyridine, whereby the mass solidifies. The crystallized reaction product dissolves readily in water and forms clear, strongly foaming solutions which also have washing and dispersing power and improve the fastness of dyeings.

Instead of pyridine, corresponding amounts of an alcoholic solution of trimethylamine, dimethyl-dodecylamine, methylpiperidine and the like may be used. If monomethylamine, dimethylamine, dodecylamine, piperidine or other primary or secondary amines be used, it is advantageous subsequently to carry out a treatment with dimethyl sulphate, methyl bromide or benzyl bromide. All the products may also be used as softening agents for artificial silk.

Example 3

A mixture of 255 parts of octodecylamine, 79 parts of pyridine and 143 parts of beta,beta'-dichlordiethyl ether is heated for 6 hours at 130° C. under reflux. When cooled, the product solidifies to a pale brownish mass. By treatment with a little ethyl acetate, a white crystalline product may be obtained therefrom which is suitable as a softening agent for artificial silk. The clear aqueous solutions of the product have strong wetting and foaming power.

Example 4

143 parts of beta,beta'-dichlordiethyl ether and 423 parts of dimethyldodecylamine are heated for 3 hours at from 180° to 190° C. The reaction mixture solidifies to a yellowish waxy mass which is soluble in water giving a clear solution and which has not only good wetting and foaming power but also disinfecting properties.

Example 5

198 parts of an amine obtained by converting naphthenic acid into the corresponding nitrile and hydrogenation are heated with 125 parts of beta-chlor-beta'-hydroxydiethyl ether for 5 hours at from 160° to 170° C. After adding 95 parts of chloracetic acid, the whole is further heated at 160° C. with a descending condenser. When the esterification is completed, the whole is heated on the waterbath with 79 parts of pyridine. The resulting product has properties similar to those of the product obtainable according to Example 2.

Example 6

171 parts of alpha-ethylnaphthylamine, 423 parts of dimethyldodecylamine and 143 parts of beta,beta'-dichlordiethyl ether are heated for 5 hours at from 180° to 190° C. A solid reaction product is obtained which dissolves in water giving a clear solution.

Example 7

291 parts of dihydroabietinylamine and 250 parts of a mixture of tertiary amines

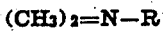
$$(CH_3)_2 = N-R$$

(R being the radical of the fatty alcohols obtainable by reduction of palm kernel fatty acids) are heated with 143 parts of beta,beta'-dichlordiethyl ether for 5 hours at from 170° to 180° C., the reaction mixture thus solidifying. The water-soluble reaction product may be used as a softening agent in the textile industry.

Example 8

300 parts of colophony and 300 parts of beta-chlor-beta'-hydroxydiethyl ether are heated to from 190° to 200° C. until the acid value has fallen to below 4. During the heating, a mixture of water and beta-chlor-beta'-hydroxydiethyl ether distils over. The remainder of the said ether and the resin oil are removed in vacuo. The residue remaining is heated for 5 hours at from 130° to 140° C. with 79 parts of pyridine. A resinous mass is formed which is readily soluble in water giving a clear solution and which may be used for rendering artificial silk non-slip or for fixing substantive dyestuffs on viscose artificial silk.

Example 9

36 parts of beta,beta'-dichlordiethyl ether and 128 parts of octodecylamine are heated in an oil-bath at from 160° to 170° C., reaction taking place with strong ebullition. The reaction product, which is soluble in water giving a clear solution, is an excellent softening agent for textiles, leather and the like.

Example 10

36 parts of beta,beta'-dichlordiethyl ether are added gradually while stirring well at from 90° to 100° C. to 75 parts of a mixture of polyalkylene polyamines obtained by the reaction of amonia with ethylene chloride. The mixture is stirred for an hour at the said temperature, 111 parts of the resulting product are dissolved in 200 parts of water and then 500 parts of dimethyl sulphate and 240 parts of caustic soda solution of 40° Baumé strength are added at 30° C. The mixture is stirred for 14 hours at room temperature, the peralkylation product is neutralized with sulphuric acid and the solution evaporated in vacuo. By crystallization of the residue from alcohol, a colorless product which is soluble in water giving a clear solution is obtained which improves the fastness to water of substantive dyeings in an excellent manner.

*Example 11*

415 parts of beta-chlor-beta'-hydroxydiethyl ether and 858 parts of octodecylamine are heated for an hour at 160° C. The hydrochloride of the base formed and in particular its salts with acetic and formic acid are very suitable as softening agents for artificial silk and as additions to spinning solutions.

*Example 12*

360 parts of beta,beta'-dichlordiethyl ether and 926 parts of dodecylamine are heated for an hour at 160° C., whereby a vigorous reaction ensues. 450 parts of the product thus obtained are heated with 580 parts of ethylene oxide and 5 parts of sodium ethylate at from 150° to 160° C. in an autoclave until the excess pressure has disappeared. The resulting liquid product, which dissolves in water giving a clear solution, has very good action in dispersing calcium soaps and excellent levelling action in vat liquors.

*Example 13*

360 parts of beta,beta'-dichlordiethyl ether and 1330 parts of octodecenylamine are heated at 160° C. for an hour. 676 parts of the reaction product obtained, 352 parts of ethylene oxide and 5 parts of sodium ethylate are heated in an autoclave at 160° C. until the excess pressure has disappeared. The product, which is soluble in water giving a clear solution, may be used for example as a washing agent for wool.

If 660 parts of ethylene oxide and 4 parts of sodium ethylate be used instead of the stated amounts, a product is obtained having especially good levelling action in vat liquors.

*Example 14*

270 parts of an amine mixture obtainable by converting the unsaturated acids of train oil into the corresponding nitrile mixture and hydrogenating the same are heated for 3 hours at from 150° to 160° C. with 125 parts of β-chlor-β'-hydroxydiethylether. A yellowish white wax-like product is formed which is readily soluble in water and is especially suitable as a softening agent for artificial silk.

If 72 parts of β,β'-dichlordiethyl ether are employed and heating is effected for 2 hours at from 160° to 170° C., a product clearly soluble in water is also formed; it may be employed with advantage as a softening agent for textiles and leather or as an emulsifying agent.

What we claim is:

1. The process of producing nitrogenous condensation products, which comprises causing a β,β'-dihalogendiethylether to react with at least 2 molecular proportions of at least one amine, the amines being so selected that the final product contains at least one non-aromatic radicle containing at least 12 carbon atoms directly attached to one another.

2. The process of producing nitrogenous condensation products, which comprises causing a β,β'-dihalogendiethylether to react with at least 2 molecular proportions of at least one amine, the amines being so selected that the final product contains at least one non-aromatic radicle containing at least 12 carbon atoms directly attached to one another and converting the resulting product into a quaternary ammonium compound.

3. The process of producing nitrogenous condensation products, which comprises causing β,β'-dichlordiethylether to react with at least 2 molecular proportions of at least one amine, the amines being so selected that the final product contains at least one non-aromatic radicle containing at least 12 carbon atoms directly attached to one another.

4. The process of producing nitrogenous condensation products, which comprises causing β,β'-dichlordiethylether to react with at least 2 molecular proportions of an aliphatic amine containing a radicle with at least 12 carbon atoms directly attached to one another.

5. The process of producing nitrogenous condensation products, which comprises causing β,β'-dichlordiethylether to react with at least 2 molecular proporions of at least one amine, the amines being so selected that the final product contains at least one non-aromatic radicle containing at least 12 carbon atoms directly attached to one another and converting the resulting product into a quaternary ammonium compound.

6. The process of producing nitrogenous condensation products, which comprises causing β,β'-dichlordiethylether to react with at least 2 molecular proportions of an aliphatic amine containing a radicle with at least 12 carbon atoms directly attached to one another and converting the resulting product into a quaternary ammonium compound.

7. Nitrogenous condensation products corresponding to the formula X—$C_2H_4$—O—$C_2H_4$—Y, wherein X stands for the residue of an amine containing a non-aromatic radicle containing at least 12 carbon atoms directly attached to one another and Y stands for the residue of an amine both X and Y being attached to the adjacent ethylene group by their amino nitrogen atom.

8. Nitrogenous condensation products corresponding to the formula X—$C_2H_4$—O—$C_2H_4$—Y, wherein X and Y stand each for the residues of an aliphatic amine containing at least 12 carbon atoms directly attached to one another both X and Y being attached to the adjacent ethylene group by their amino nitrogen atom.

9. Nitrogenous condensation products corresponding to the formula X—$C_2H_4$—O—$C_2H_4$—Y, wherein X stands for a quaternary ammonium group containing a non-aromatic radicle containing at least 12 carbon atoms directly attached to one another and Y stands for a quaternary ammonium group both X and Y being attached to the adjacent ethylene group by their quaternary ammonium nitrogen atom.

10. Nitrogenous condensation products corresponding to the formula X—$C_2H_4$—O—$C_2H_4$—Y, wherein X and Y stand each for a quaternary ammonium group containing an aliphatic radicle containing at least 12 carbon atoms directly attached to one another both X and Y being attached to the adjacent ethylene group by their quaternary ammonium nitrogen atom.

HANS KRZIKALLA.
CONRAD SCHOELLER.
WILHELM PANNWITZ.
HEINRICH DENNER.